July 23, 1940.  C. T. STEWART ET AL  2,209,252
APPARATUS FOR GLAZING GLASSWARE
Filed Feb. 11, 1937  8 Sheets-Sheet 1
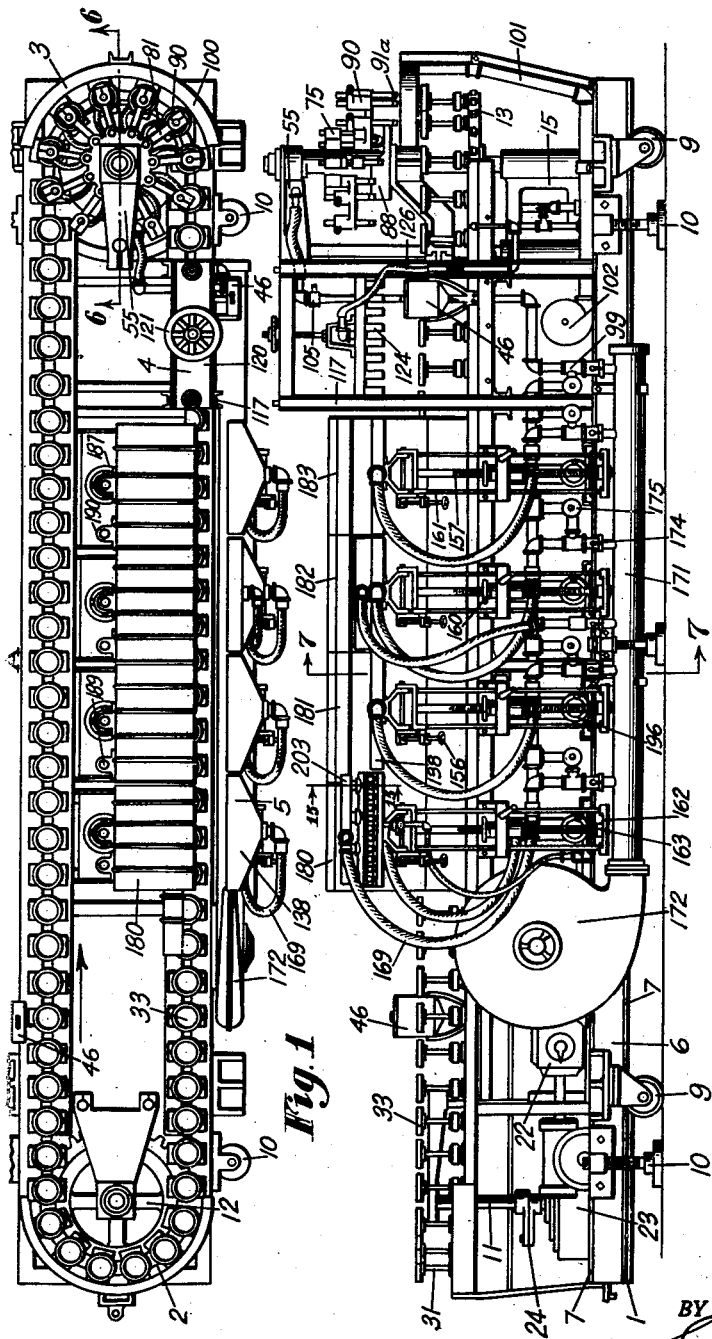
INVENTORS.
Charles T. Stewart.
Charles O. Stewart.
BY
ATTORNEYS.

July 23, 1940.  C. T. STEWART ET AL  2,209,252
APPARATUS FOR GLAZING GLASSWARE
Filed Feb. 11, 1937  8 Sheets—Sheet 2

INVENTORS.
Charles T. Stewart.
Charles O. Stewart.
BY
ATTORNEYS.

INVENTORS.
Charles T. Stewart.
Charles O. Stewart.
BY
ATTORNEYS.

July 23, 1940.  C. T. STEWART ET AL  2,209,252
APPARATUS FOR GLAZING GLASSWARE
Filed Feb. 11, 1937   8 Sheets-Sheet 6
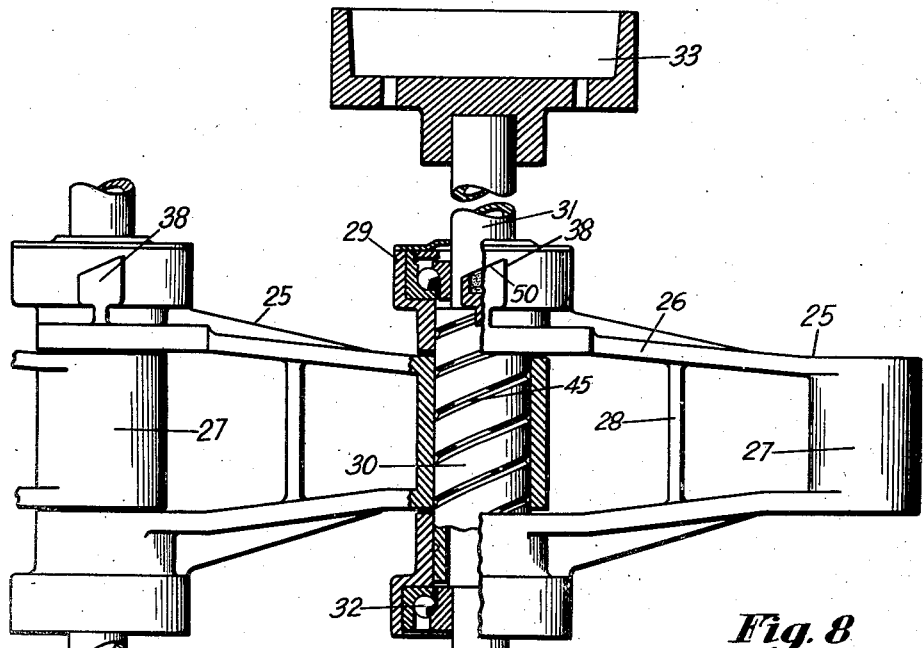
Fig. 8
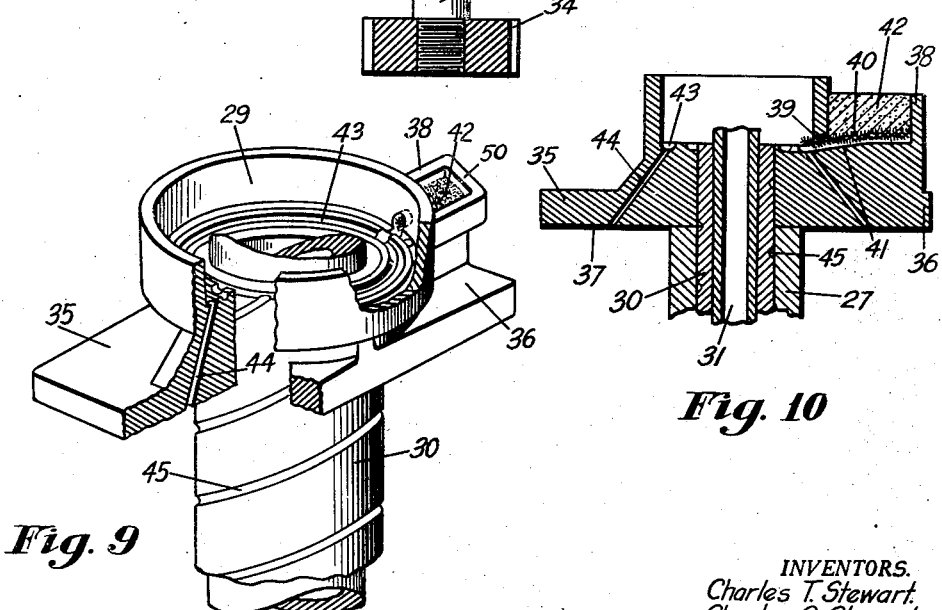
Fig. 9
Fig. 10
INVENTORS.
Charles T. Stewart.
Charles O. Stewart.
BY
ATTORNEYS.

July 23, 1940.    C. T. STEWART ET AL    2,209,252
APPARATUS FOR GLAZING GLASSWARE
Filed Feb. 11, 1937    8 Sheets-Sheet 7

INVENTORS.
Charles T. Stewart.
Charles O. Stewart.
BY
ATTORNEYS.

July 23, 1940.                C. T. STEWART ET AL                2,209,252
APPARATUS FOR GLAZING GLASSWARE
Filed Feb. 11, 1937                 8 Sheets-Sheet 8

INVENTORS.
Charles T. Stewart
Charles O. Stewart
BY
ATTORNEYS.

Patented July 23, 1940

2,209,252

UNITED STATES PATENT OFFICE 2,209,252

APPARATUS FOR GLAZING GLASSWARE

Charles T. Stewart, Newark, Ohio, and Charles O. Stewart, Chicago, Ill., assignors to The Glapat Corporation, Zanesville, Ohio, a corporation of Ohio Application February 11, 1937, Serial No. 125,278

7 Claims. (Cl. 49—58)

Our invention relates to apparatus for glazing glassware. It has to do, more particularly, with method and apparatus for forming a fine polish or glaze on various types of articles of glassware.

There have been many different types of machines for glazing glassware devised in the past. Such prior art machines, however, have been possessed of certain undesirable features. Most of such machines have consumed an excessive amount of fuel. Furthermore, such machines have been so constructed that they are easily affected by the excessive heat, developed during the glazing operation, in such a manner as to render them inoperative. Another disadvantage of prior art machines of this general type resides in the fact that they are usually not provided with an efficient lubricating system and, consequently, excessive wear of the various parts results. These prior art machines are also usually of such a construction that broken glass and grit accumulate in the various moving parts which also brings about excessive wear.

Another disadvantage of prior art glazing machines has resided in the fact that the glazing burners have not been efficient, resulting in the use of an excess of fuel, and have not been individually controllable in order that individual burners could be adjusted differently to take care of various conditions of operation. Furthermore, the positions of the burners could not be readily and individually adjusted in accordance with various conditions of operation.

Prior art machines of this general type have been of such a nature that they have not produced a sufficiently high polish on the glassware. Furthermore, they have not been of such a nature that a single machine could be used for polishing or glazing a large number of different types of glassware. Also, these prior art machines merely polish the outside of the article and do not polish the inside of the article. Furthermore, they usually cause distortion of the article during the glazing operation.

One of the objects of our invention is to provide apparatus for glazing or polishing articles of glassware which is very efficient and will produce a fine polish or glaze on articles of glassware at a low cost.

Another object of our invention is to provide a glazing machine which is of such a nature that it will use a minimum amount of fuel.

Another object of our invention is to provide a machine for glazing articles of glassware which is of such a nature that it may be employed for polishing or glazing a large number of different types of glassware.

Another object of our invention is to provide a glazing machine which is of such a nature that it may be used to produce a high polish on both the exterior and the interior of a glass article, or either on the exterior or interior alone.

Another object of our invention is to provide a glazing machine which is of such a nature that it will efficiently glaze or polish the glass articles without causing undesirable distortion thereof.

Another object of our invention is to provide a glazing machine wherein the glazing burners are individually adjustable so that they may be individually adjusted to obtain the best results.

Another object of our invention is to provide a glazing machine wherein a number of successive glazing burners are provided for polishing the articles, these burners being individually controllable so that the best conditions for producing the highest polish without distortion may be obtained.

Another object of our invention is to provide a glazing machine which is so constructed that it is protected from the excessive heat developed during the glazing operation so that the various parts thereof will not be injured by such heat.

Another object of our invention is to provide a glazing machine of the type indicated which is equipped with an effective lubricating system which operates automatically so that its efficiency is not dependent upon an operator.

Another object of our invention is to provide a glazing machine which is so constructed that broken glass and grit cannot accumulate in the various moving parts and cause excessive wear.

In its preferred form our invention contemplates the provision of a machine which will polish both the inside and outside of glass articles, such as tumblers, but which may be used for polishing only the inside or the outside. We preferably provide a machine wherein the interior of the article is first polished and then the exterior of the article is polished. During the polishing of the interior of the article, the exterior thereof is preferably cooled by currents of cooling air. After the interior of the article is polished, the interior is also preferably subjected to cooling currents of air. Cooling of the article in this manner prevents distortion thereof during the glazing operation. After the interior of the article is polished and after it is cooled sufficiently, the article is subjected to a glazing operation which polishes the exterior thereof. It will be obvious that the sequence of these steps might be changed and that it is not necessary to polish both the exterior and interior but either may be polished.

The machine which we use preferably comprises an endless chain or conveyor which moves in a horizontal plane. This chain or conveyor carries a plurality of spaced upstanding article-supporting spindles. The chain is adapted to conduct the articles past the various units. The chain moves continuously and the various operations are performed by the various units during movement of the chain.

The preferred embodiment of our invention is illustrated in the accompanying drawings wherein similar characters of reference designate corresponding parts and wherein:

Figure 1 is a plan view of the entire machine.

Figure 2 is a side elevation of the entire machine.

Figure 8 is a view partly in side elevation and partly in section showing two links of the chain conveyor and illustrating how they are pivoted together.

Figure 9 is a perspective view, partly broken away, showing the pivotal connection for the link of the chain conveyor and the lubricating means provided therefor.

Figure 10 is a vertical section of the structure illustrated in Figure 9.

Figure 3:
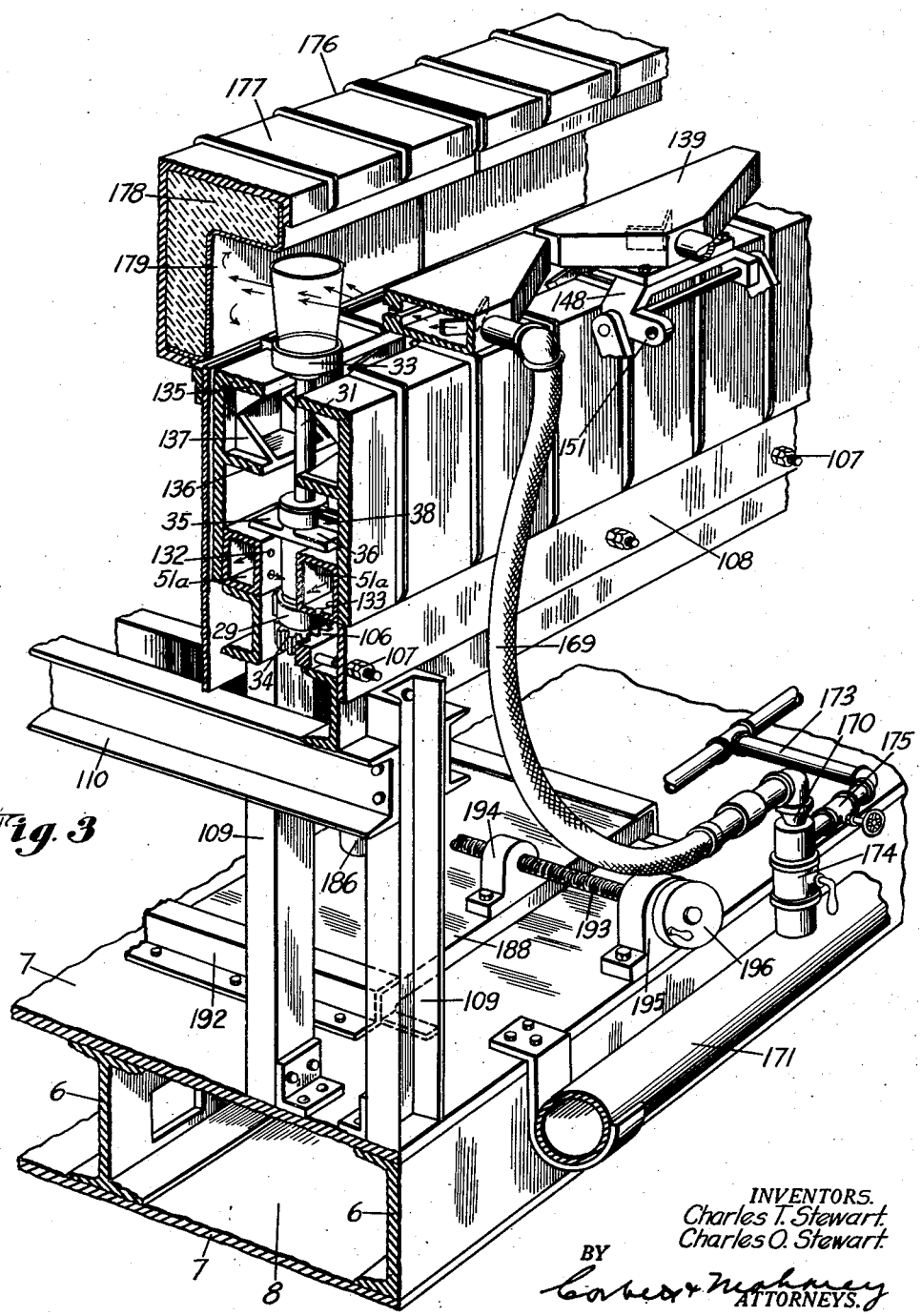
Figure 3 is a perspective view of a portion of the machine showing the glazing burners for polishing the exterior of the articles.

With reference to the drawings, and particularly to Figures 1 and 2, we have illustrated our machine as comprising mainly a frame, indicated generally by the numeral 1, and an endless chain conveyor, illustrated generally by the numeral 2, which is horizontally disposed and which is adapted to conduct the glass articles through a number of units provided at intervals along the conveyor. These units comprise an internal polishing unit, indicated generally by the numeral 3, which is also provided with means for cooling the exterior of the article, an internal cooling unit 4, and an external polishing unit 5.

The lower portion of the frame is made up of a plurality of laterally spaced longitudinally extending beams 6 which are connected together by flat plates 7 which are preferably welded to the upper and lower edges of the beams 6. The beams 6 and the plates 7 cooperate to form chambers 8 which may be used for containing oil that is used by the machine. The frame is supported on a plurality of casters 9 so that it may be readily moved. However, a plurality of jacks 10 are provided which may be adjusted to raise the frame so that the rollers or casters 9 will not contact with the ground. Thus, the machine will be firmly held in position.

Figure 6:
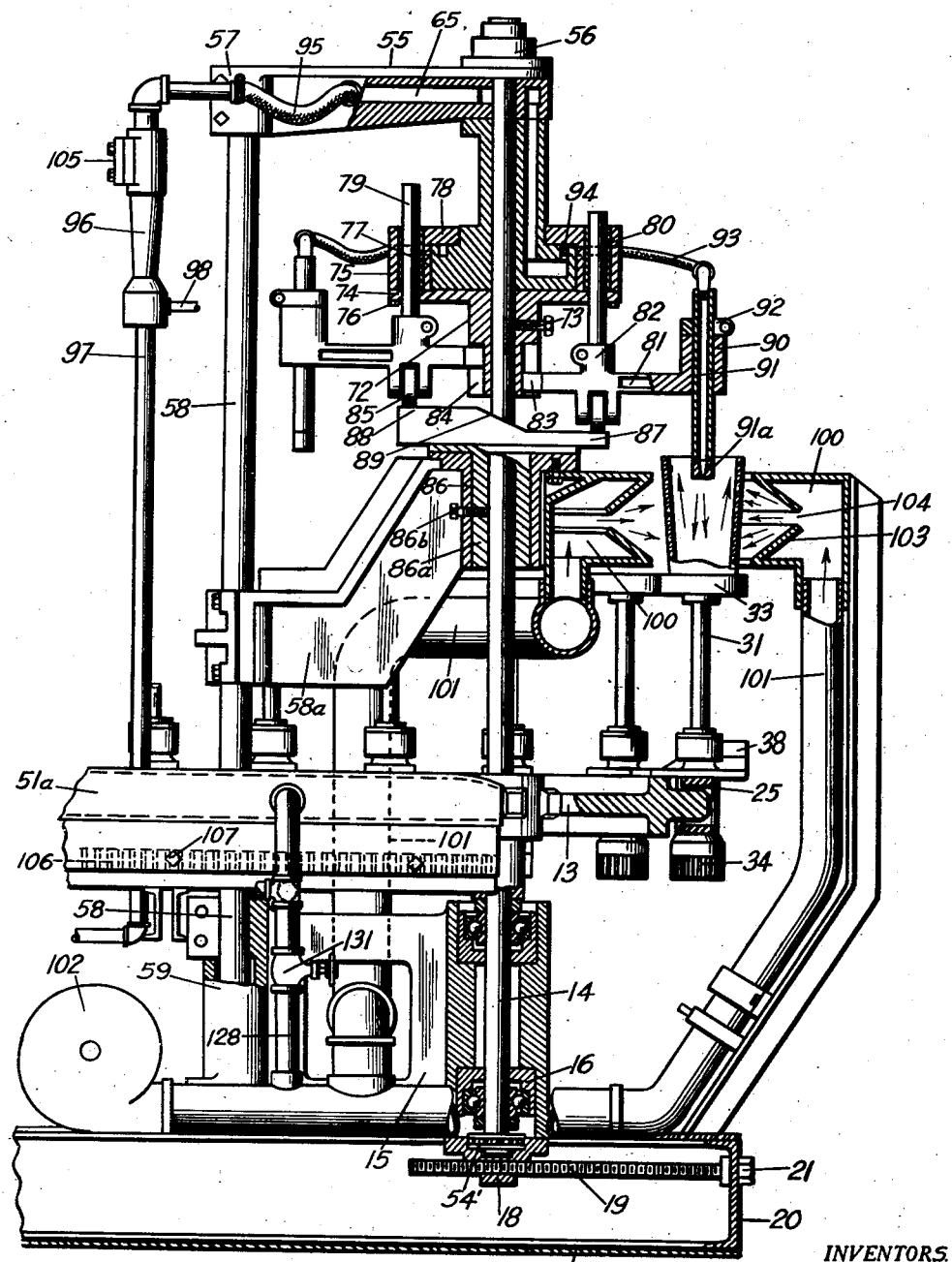
Figure 6 is a section taken through the machine substantially along line 6—6 of Figure 1 illustrating the interior polishing unit in operation.

At one end of the frame 1 a vertically disposed shaft 11 is provided. On the upper end of this shaft a driving sprocket 12 is keyed and is adapted to drive the chain conveyor 2. The opposite end of the chain conveyor passes around a driven sprocket 13 (Figure 6). This driven sprocket 13 is keyed on a vertically disposed shaft 14 which is rotatably mounted in a support 15 by means of vertically spaced ball bearings 16. The shaft 14 extends upwardly through the sprocket 13 for a purpose which will be explained hereinafter. The sprockets 12 and 13 are spaced a suitable distance above the base of the machine and are in horizontal alignment with each other. The shafts 11 and 14 are also in alignment with each other. The shaft 11 is mounted in ball bearings similar to those which carry the shaft 14.

In order to take up the slack in the chain conveyor, the support 15 is mounted on the base of the machine for movement longitudinally thereof. The support 15 is provided with suitable guides which extend downwardly through a longitudinal slot 17 (Figure 4) formed in the top plate 7 of the base of the machine. One of the depending guides 18 (Figure 6) has a screw 19 threaded therethrough. The outer portion of this screw extends through an opening in a transverse beam 20 which forms a part of the lower section of the frame 1. By means of the head 21, the screw 19 can be rotated and will move the support 15 longitudinally of the machine so as to properly adjust the tension of the chain conveyor.

The chain conveyor 2 is driven by means of an electric motor 22 (Figure 2) which drives a gear reduction unit 23. The gear reduction unit 23 is connected to the shaft 11 by means of a safety shear arm 24 which will operate in an emergency to break the driving connection between shaft 11 and the motor 22.

The structure of the chain conveyor 2 is illustrated best in Figures 8, 9 and 10. The chain conveyor embodies a plurality of separate links 25 of the shape shown in Figure 8, these links being pivotally connected to each other. Each of the links embodies a pair of vertically spaced horizontally disposed arms 26. One end of these arms is connected together by means of an integral sleeve 27. The arms are also connected together intermediate their ends by means of an integral rib 28. The opposite ends of the arms are not connected together and are disposed in spaced relation. However, each of the arms has an integral bearing housing 29 formed thereon at this end.

To connect two of the adjacent links together, the sleeve 27 at the end of one of the links is slipped between the bearing housings 29 at the opposite end of the other link. A bushing 30 is then passed through the sleeve 27 and the aligning openings in the bearing housings 29. A spindle 31 is then passed through the bushing 30. This spindle 31 is rotatably carried by the ball bearings 32 carried in the housings 29. Thus, the spindle 31 together with the bushing 30 serve to pivotally connect the two adjacent links together.

The spindle 31 carries a cup or article receiving chuck 33 on its upper end, the cup being keyed to the spindle so that it will rotate therewith. The lower end of the spindle has a pinion 34 threaded thereon. This pinion is adapted to mesh with a rack, as will later appear, in order to rotate the spindle and the cup. It will be understood that the pinion 34 is threaded on the spindle 31 in such a manner that when it meshes with the rack, there will be a tendency for it to be tightened on the spindle. The upper bearing housing 29 of each link is provided with diametrically opposed projections 35 and 36 formed integral therewith. Each of these projections has a flat lower surface adapted to slide along a track provided, as will later appear, for supporting and guiding the conveyor.

We provide a lubricating system for continuously and automatically lubricating the pivotal connections and spindle bearings of the chain conveyor, the tracks upon which the projections 35 and 36 slide, the pinion 34 and the rack with which it meshes, and other associated parts. For this purpose, an oil cup 38 is formed on the upper side of the projecting portion 36. This oil cup is in communication with the interior of the upper bearing housing 29 by means of a duct 39. A wick 40 is disposed in the bottom of the cup 38 and extends through the duct 39 into the bearing housing 29. The bottom of the cup 38 is inclined as at 41 so that when oil is supplied to the cup, it will tend to flow down through the duct 39. Glass wool, indicated at 42, is preferably disposed in the cup 38 so that it will serve as a filter for the oil supplied thereto.

As shown in Figure 9, the bottom of the upper bearing housing 29 is provided with a plurality of annular grooves 43 which receive the oil from the cup 38. One of these grooves communicates with outwardly and downwardly extending ducts 44 which convey the lubricant to the surfaces 37 of the projections 35 and 36 and, thus, serve to lubricate these surfaces and the tracks over which they slide. Another of these grooves 43 is in communication with a helical groove 45 formed in the exterior of the bushing 30.

It will be understood that oil supplied to the cup 38 will pass to the bearings disposed in the upper housing 29. It will then pass downwardly along the helical groove 45 and during its passage will lubricate the bushing 30 and the cooperating surfaces of the sleeves 27 and bearing housings 29. The oil will continue to pass downwardly until it reaches the ball bearing in the lower housing 29. Some of it will pass through this bearing and will drop onto the pinion 34 so as to lubricate it and the rack with which it meshes. Oil will also pass from the upper bearing housing 29 through the ducts 44 to the tracks over which the surfaces 37 slide. Thus, all the parts of the chain conveyor and associated parts are properly lubricated.

In order to provide means for supplying oil automatically to the spaced cups 38 carried by the chain conveyor, we provide small tanks 46 (Figure 7) which are suitably supported at spaced positions along the path of movement of the chain conveyor. Each tank has a small tube 47 extending from the outlet thereof which is controlled by a valve 48. The tube 47 projects over the path of movement of the cups 38 and is provided with a wire 49 extending therefrom and along which the oil is adapted to flow, the wire serving as a wick. When each cup moves past the tank 46, the wire 49 is adapted to contact with the cup so that a small amount of oil is wiped from the wire by means of the glass wool in the cup. To facilitate this wiping action, the upper edge of the cup is beveled as indicated at 50 in Figure 9, the lower edge of the cup being forwardmost. The valve 48 may be adjusted to control the amount of oil supplied to the various cups 38. It will be apparent that as the conveyor moves along, oil is supplied automatically and continuously to the various cups 38 and that this oil will ultimately reach the various parts which should be lubricated. Thus, it is not necessary to depend on the operator to lubricate the machine.

Figure 7:
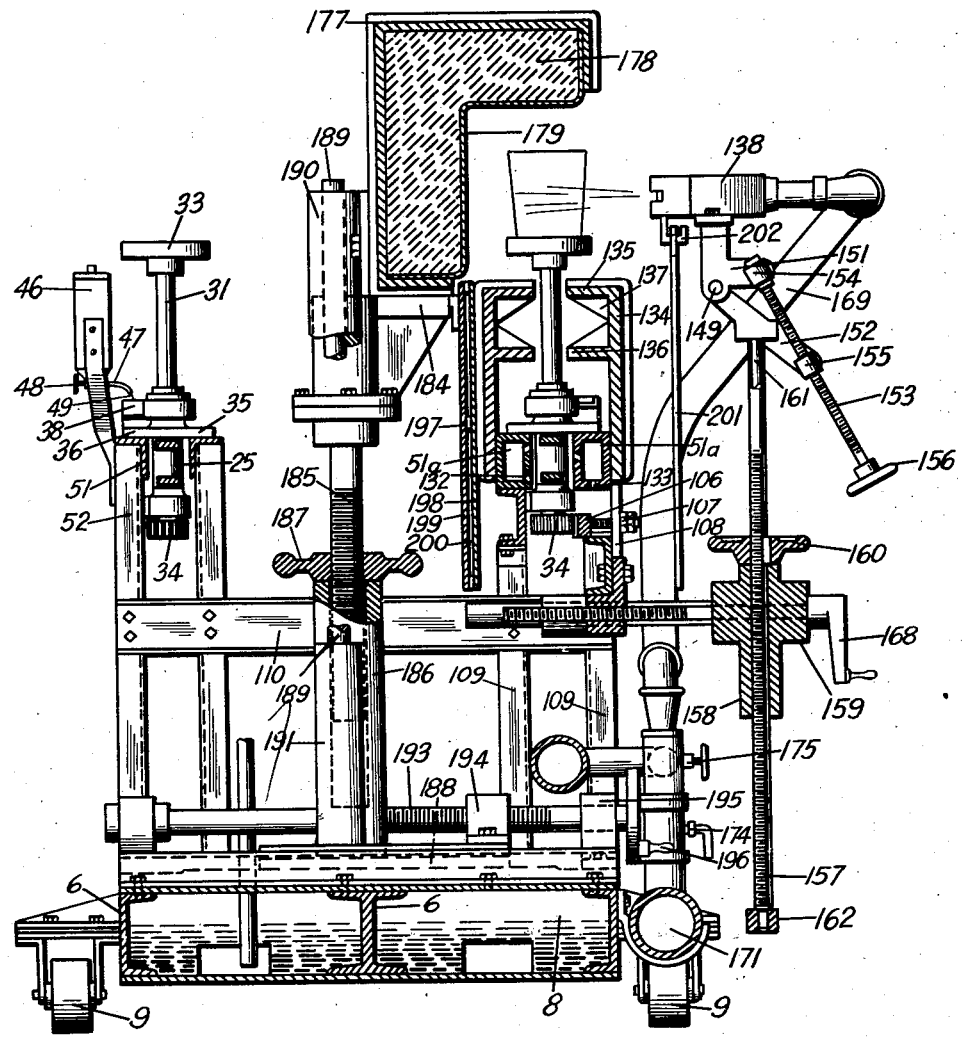
Figure 7 is a section taken substantially along line 7—7 of Figure 2 illustrating the exterior polishing unit in operation.

The articles are adapted to be positioned on the conveyor substantially at the point A illustrated in Figure 1. They are also removed substantially at this point. The conveyor is moved in the direction indicated by the arrows in this figure. At this side of the machine, the conveyor chain is supported by means of a pair of tracks 51 which are formed of angle iron and which extend longitudinally of the machine. These tracks are disposed in spaced relation and are supported on the upper ends of spaced upstanding columns 52 which are secured to the base of the machine and are arranged at longitudinal intervals in pairs. These tracks 51 extend substantially the full length of the machine. As illustrated in Figure 7, the projecting portions 35 and 36 of each link rest on the upper surface of these tracks and slide thereon. The lower portions of the links depend between these tracks as illustrated in this figure. Thus, the tracks 51 prevent the conveyor from sagging at the side of the machine where they are disposed.

Figure 11:
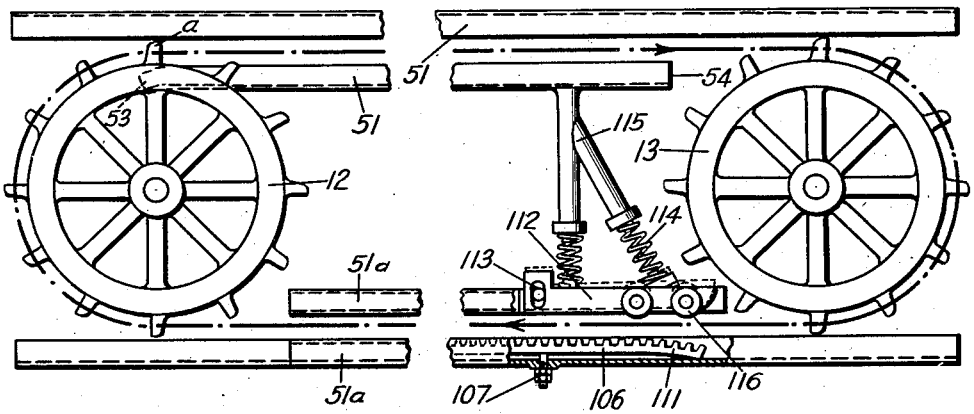
Figure 11 is a more or less diagrammatic view illustrating various parts of the chain conveyor.

It will be noted from Figure 11 that the outer track 51 extends substantially to the outermost point on the driving sprocket 12 and to the outermost point on the driving sprocket 13. However, the inner track 51 at its one end extends to a point substantially in alignment with the axis of the sprocket 12, as indicated at 53. It will be noted that the inner track 51 is substantially tangent to the sprockets 12 and 13. It will also be noted that the end 53 is curved inwardly to a slight extent and the opposite end 54 terminates short of the sprocket 13.

Due to the fact that the chain conveyor is driven by sprocket 12, there is a tendency for the links to cling to the sprocket even after they pass the point *a* indicated in Figure 11. This increases the friction and drag on the chain and the power required to drive it. This is especially true if the chain conveyor is not taut. However, since the inner track 51 is extended to the point indicated and the end 53 is turned inwardly as indicated, this end of the track will serve as a cam and will engage the lower bearing housing 29 of each link and strip it from the sprocket 12 and, thereafter, it will be guided in a straight line by the tracks 51.

After the articles are placed on the chain conveyor at station A, they are first conducted to the unit 3 which is an internal polishing unit. During the time the articles are moved from the station A to the unit 3 and during their passage through this unit, it is not necessary to rotate the articles. Consequently, along these portions of the machine we do not provide a rack for engaging the pinions 34 on the lower ends of the spindles 31.

Figures 4, 5:
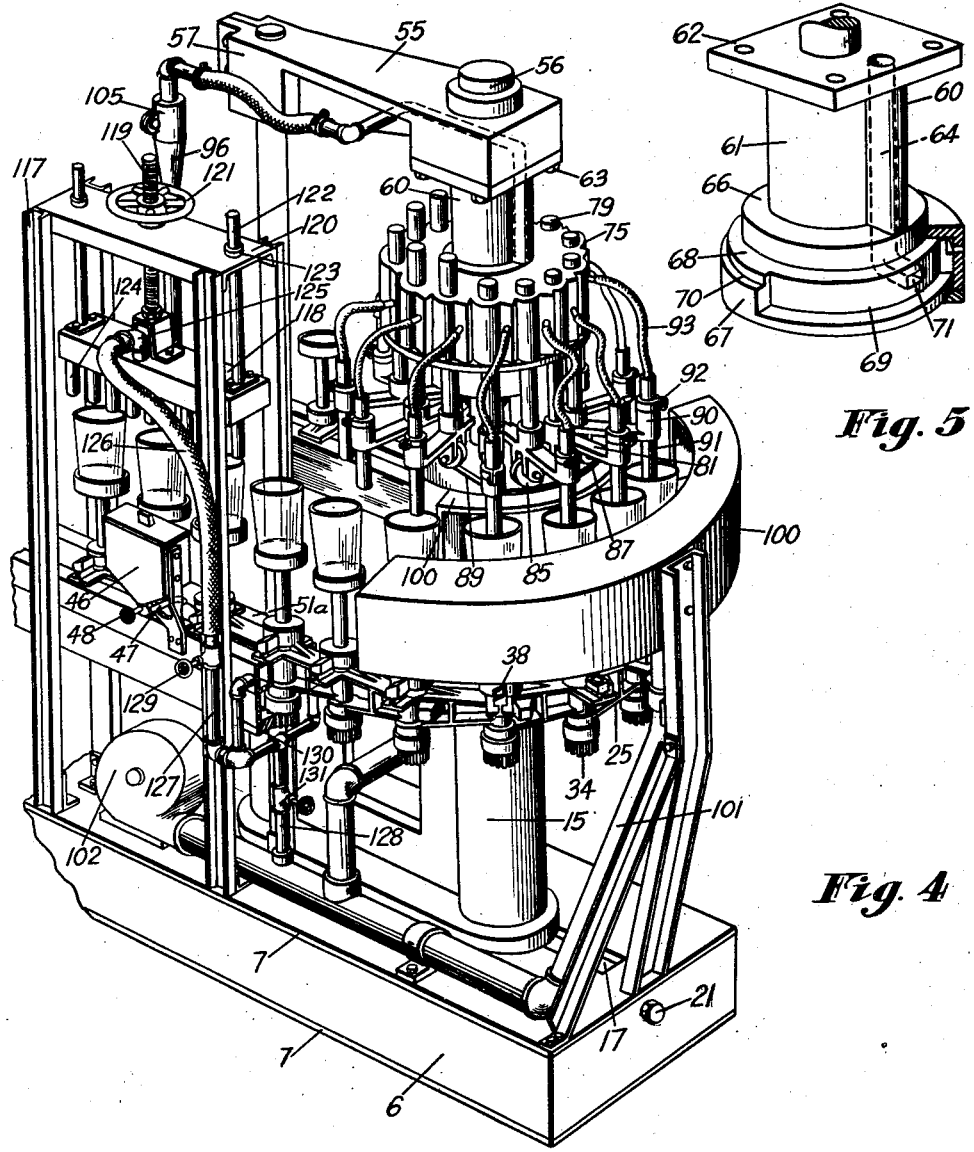
Figure 4 is a perspective view of a portion of the machine showing the unit for polishing the interior of the articles and simultaneously cooling the exterior thereof and the unit for cooling the interior of the articles.
Figure 5 is a perspective view, partly broken away, showing a manifold for supplying fuel to the burners of the interior polishing unit.

The internal polishing unit 3 is illustrated best in Figures 4 and 6. This unit is arranged at the extreme end of the machine, as illustrated in Figure 1, at the point where the conveyor passes around the sprocket 13.

This unit is carried by the upper portion of the shaft 14. Consequently, to prevent friction on the lower end of the shaft 14 we provide a ball bearing 54'. The upper end of the shaft 14 is supported for rotation in the outer end of a supporting arm 55. This arm 55 is adapted to support part of the weight of the unit which is carried by the shaft 14 and for this purpose a radial thrust bearing 56 is provided on the upper end of shaft 14 and bears against the surface of the arm 55. The arm 55 has its opposite end clamped as at 57 to the upper end of a vertically extending post 58. The lower end of this post is rigidly mounted in the sleeve 59 formed on the inner portion of the support 15. The post 58 is preferably keyed in the sleeve 59 so that it cannot rotate therein.

A manifold member 60 (Figure 5) is disposed in surrounding relation to the shaft 14 directly below the arm 55, as illustrated best in Figure 6. This manifold member embodies a substantially cylindrical body portion 61 having a plate 62 on its upper end formed integral therewith. This plate 62 is adapted to be bolted by means of bolts 63 to the lower surface of the arm 55 as illustrated in Figure 4. The shaft 14 is adapted to rotate freely within the member 60 and rotation of the member 60 is prevented by its connection to the arm 55. The member 60 has a vertically extending fuel passageway 64 which is in communication at its upper end with a passageway 65 in the arm 55. The lower end of the member 60 has integral enlarged portions 66 and 67 with the shoulder 68 therebetween. Portion 67 is cut away as at 69 at its periphery, this arcuate cut-away portion being of preselected length and cross-section. The remainder of the periphery of the portion 67 is cut away as at 70, this cut-away portion 70 being of considerably less cross-sectional area than the portion 69. The lower end of the passageway 60 is in communication with the cut-away portion 69 as at 71.

Directly below the manifold 60 we provide a burner-carrying member 72. This burner-carrying member 72 is keyed to the shaft 14 as at 73 so that it will rotate with the shaft. It is provided with an outwardly extending peripheral flange 74 which lies beneath the member 60 and this flange extends outwardly a considerable distance past the outer edge of the enlarged portion 67 carried by member 60. A ring 75 is disposed in surrounding relation to the lower end of the member 60 and rests on the upper surface of the flange 74 to which it is bolted by means of bolt 76. The inner vertical wall 77 of this ring is disposed closely adjacent the portion 67 of the member 60. This ring has an inwardly extending horizontal flange 78 which extends over and lies closely adjacent the shoulder 68. The wall 77 and the flange 78 close the chambers formed by the cut-away portions 69 and 70.

The ring 75 and the flange 74 of member 72 are provided with aligning openings at circumferentially spaced points. These openings are adapted to receive vertically slidable spindles 79. A removable greaseless bushing is provided at 80 to keep each spindle in alignment. Each spindle 79 has a burner-supporting arm 81 non-rotatably secured on the lower end thereof as at 82. Each arm 81 is horizontally disposed and its inner end is reduced at 83 and extends into a vertical slot or guide 84 provided in the lower portion of the member 72. Thus, the arm may move vertically, being guided in its vertical movement by the spindle 79 and the portion 83 which cooperates with the slot 84. Furthermore, the portion 83 and the slot 84 will prevent rotation of the arm 81 with the spindle about the axis of the spindle.

In order to move the burner-carrying arms 81 vertically, we provide a roller 85 on each arm which is located directly beneath the spindle 79. These rollers are adapted to operate on a member 86 which is disposed in surrounding relation to the shaft 14 and is always held stationary. The member 86 is rotatably mounted on a sleeve 86a mounted on the outer end of an arm 58a which has its opposite end rigidly secured to post or column 58. Thus, member 86 can be rotatably adjusted but is normally held in adjusted position by screw 86b. This member 86 has a disk or plate 87, which is horizontally disposed, on its upper edge. This plate or disk 87, for a portion of its periphery, has an upstanding flange 88 which is beveled at each end, as at 89, so that it serves as a cam member. It will be apparent that the member 72 rotates with the shaft 14, while the member 86 remains stationary. Consequently, the burner-carrying arms 81 will be raised and lowered when the rollers 85 ride up on the flange 88 and then ride down off the flange.

Each arm 81 has a sleeve 90 in its outer end in which a burner tube 91 is mounted in such a manner that it may be moved vertically therein. The burner 91 is held in proper vertical position by a clamping collar 92. The upper end of each burner 91 is connected by means of a flexible conduit 93 to a passageway 94 extending through the ring 78. The inner end of each of these passageways communicates with the chambers formed by the inner wall of the ring 75 and the cut-out portions 69 and 70 of the member 60.

It will be apparent that the member 60 will remain stationary, while the member 72 and, consequently, ring 75, rotate with the shaft 14. All of the burners 91 will always be in communication with the fuel passageway 64 and member 60. However, each of the burners during a certain interval will be in communication with the passage 60 by means of the chamber formed by the cut-out portion 59 while during another interval the burner will be in communication with the passage 60 by means of the chamber formed by the smaller cut-out portion 70. Consequently, different amounts of fuel will be supplied to the various burners at different intervals.

The passageway 65 in the arm 55 is connected by means of a conduit 95, which includes a flexible section, to a mixer 96. This mixer 96 is adapted to receive a gas and air mixture through a line 97. It is also adapted to receive oil through a line 98 connected thereto. The mixer 96 is adapted to mix the gas and air mixture with the oil. The oil is added to the fuel mixture in order that the burners 91 will form a carbon deposit on the articles which results in a finer polish. As illustrated best in Figure 2, the line 97 extends to a mixer 99 which is adapted to mix the air and gas together. This mixer 99 is of a type which will be described more in detail hereinafter with reference to another unit of the machine.

The unit 3 of the machine is provided with means for cooling the outer surface of the articles while the inner surface thereof is being polished by the burners 91. As shown best in Figure 6, for this purpose we provide air-conducting channel members 100 which are disposed in spaced relation on opposite sides of the conveyor chain. These members 100 extend along the arcuate portion of the chain conveyor. Air under slight pressure is forced into the channels 100 by means of conduits 101 extending from a blower 102. At their inner edges, converging baffle members 103 are provided, there being a slot 104 between the inner edges of the baffles. It will be apparent from Figure 6 that the air will flow from the slot 104 and will spread, this being permitted by the position of the baffle so as to cover the entire article.

In the operation of this internal polishing unit 3, it will be apparent that the conveyor will move the articles along until they pass between the members 100. At the same time, the burner-carrying member 72 is being rotated, since it rotates with the shaft 14, and the member 86 is stationary. The cam member 88 is so constructed that as one of the rollers 85 rides downwardly along the surface 89 the arm 81 which carries such roller will move downwardly causing the burner 91, carried thereby, to enter the upper end of the article. The cut-away portion 69 of member 60 is of such length and so positioned relative to cam 88 that at the time the burner 91 enters the article the inner end of the passageway 94 connected to that particular burner will be in communication with the chamber formed by the cut-away portion 69. Thus, at this time, a maximum amount of fuel will be supplied to the burner. This will cause a large flame to issue from the nozzle 91a of the burner, which will contact with the bottom of the article and will then be deflected upwardly along the sides of the article, as indicated by the arrows. The conveyors continue to move and the burners 91 are allowed to remain in the articles for a sufficient period of time to properly polish them. However, during this internal polishing, cooling air is directed on the outer surface of the article by members 100 so that distortion of the articles during the internal polishing operation, will be prevented.

As the conveyor continues to move the rollers 85 begin to ride up on the surface 89 of cam 88 which causes the arms 81 to be raised and the burners 91 to be withdrawn from the articles. At this time, the articles leave the space between the member 100. At the same instant that the burner is withdrawn from the article, the inner end of the passage 94 connected thereto comes opposite the end of the cut-away portion 70. Consequently, less fuel will be supplied to the burner.

Thus, it will be apparent that the inside of the article is polished at the same time the outside thereof is cooled. Furthermore, when the burners are in the articles, the maximum amount of fuel is supplied thereto but when the burners leave the articles a minimum amount of fuel is supplied thereto. Thus, although the burners burn at all times, when not in the articles they have only a small amount of fuel supplied thereto. Thus, a great saving in fuel results and overheating of the burners and other parts of the machine is avoided.

The mixer 96 which supplies the proper mixture to the various burners is provided with a diaphragm 105 clamped over an opening provided therein. This diaphragm is preferably made of thin metal, such as copper, which will burst in case of a backfire explosion.

After the articles leave the internal polishing unit 3, they pass through the unit 4 which is provided for cooling the interior of the articles. As the articles enter this unit 4, the links pass between tracks 51a, shown in Figures 4, 7 and 11. These tracks 51a are spaced parallel tracks, as indicated best in Figure 11. The inner track 51a is substantially tangent to the sprockets 12 and 13 and terminates at each end just short of the adjacent sprockets. The outer track 51a extends a farther distance at each end than the inner track and terminates at a point substantially in line with the outermost point on the sprocket at that end. The projections 35 and 36 of the links are adapted to slide on the upper surfaces of these tracks.

When the conveyor reaches the tracks 51a, it is desirable to rotate the spindles 31 so that the articles carried thereby will be rotated. For this purpose, we provide a rack 106 for engaging the pinions 34 on the lower end of the spindles. This rack 106 is bolted by means of bolts 107 (Figure 7) to a plate 108 directly beneath the outer track 51a. The two tracks 51a are supported by means of pairs of columns 109 arranged at longitudinally spaced intervals and being secured to the top plate 7 of the base of the machine. A plurality of transversely extending beams 110 are bolted to the columns 52 and 109 so that the frame of the machine will be rigid.

The end of the rack 106 which is first engaged by the pinions 34 is curved outwardly slightly as at 111 (Figure 11). In order to insure proper meshing of the pinions with this rack, the inner track 51a adjacent this end is provided with a section 112 which is resiliently mounted so that it may move inwardly when the proper amount of force is applied thereto. The inner end of this track section 112 is connected to the main section of the track 51a by means of a pivotal pin and slot connection 113. This section 112 of the track is normally held in alignment with the main section of the track by means of compression springs 114 mounted on the outer ends of a Y-shaped arm 115 which projects horizontally across the machine from the inner track 51 upon which it is mounted. Two spaced rollers 116 are provided adjacent the outer end of the section 112.

As the links of the conveyor enter the space between the outer end of the section 112 of the inner track 51a and the outer track 51a, the pinions will simultaneously engage the rack 111. If the pinions do not properly engage the rack, there will be a tendency for the links to be forced inwardly away from the rack. This will be permitted because the section 112 of the inner track 51a will be moved inwardly against the force of the springs 114. Thus, stripping of the teeth from the rack and the pinions is prevented. The pinions upon entering this space will rotate until they properly mesh with the rack. The section 112 of the inner track 51a is of sufficient length to insure that the pinions will be in mesh with the rack before they pass the inner end of this section.

It will be apparent from this that as the articles enter the internal cooling unit 4, they begin to rotate about their axes. This internal cooling unit is illustrated best in Figure 4. It comprises a vertically disposed frame 117 from which a member 118 is adapted to be suspended so that it will be located over the conveyor and the articles carried thereby. This member 118 is mounted for vertical adjustment on the frame 117 by means of a screw 119 which passes through an opening in the top 120 of the frame. A handwheel 121 is threaded on the screw 119 above the beam 120 and is adapted to rest on the beam. A pair of guide rods 122 extend upwardly from the member 118 and pass loosely through bushings 123 carried by the beam 120. It will be apparent that the member 118 may be adjusted vertically merely by turning handwheel 121 and that vertical movement is guided by the rods 122.

The member 118 carries a plurality of longitudinally spaced depending air nozzles or tubes 124. This member 118 is hollow and the chamber formed therein communicates with all of the nozzles 124. For conducting air to the interior of the member 118, a connection 125 is provided which is connected to a flexible conduit 126. This conduit 126 is connected by pipe 127 to a pipe 128 which is connected to the conduit 101 that leads from the blower 102. The pipe 127 is provided with a valve 129 for controlling the supply of air to the member 118.

It will be apparent that as the articles are conveyed through this unit 4, air is supplied to the member 118 and, consequently, the nozzles 124. This air will blow down onto the articles and into the interior thereof and will thus cool the articles. The vertical position of the member 118 and, consequently, the nozzles 124, will depend upon the height of the articles carried by the conveyor. The pressure of the air which is directed on the articles by the nozzles 124 should not be so great as to blow the articles from the chucks or cups 33.

After the articles leave unit 4, they pass into the external polishing unit 5. This unit is illustrated best in Figures 3 and 7.

Because of the heat developed by this unit, it is desirable to protect the tracks 51a from this excessive heat. It will be noted from Figure 7 that the tracks 51a are of rectangular cross-section. We provide means for circulating air through these tracks in order to cool them. As shown in Figure 4, the pipe 128 connected to conduit 101 is provided with branches connected to pipes 130. Each pipe 130 is connected to the interior of one of the tracks 51a. Flow of air from conduit 101 to the interior of the tracks 51a is controlled by valve 131 provided in the pipe 128. Each of the tracks is provided with a plurality of ports 132 at longitudinally spaced intervals for directing air inwardly on the links of the conveyor in order to cool them. The outer track 51a is provided with a series of ports 133 directed downwardly for cooling the rack 106.

To further protect the tracks from heat developed in the unit 4, they are provided with upstanding guards 134 of metal. Each guard has its lower edge secured to the outer surface of the adjacent track 51a. At their upper edges these guards 134 are provided with vertically spaced inwardly directed baffles 135 and 136 which are reenforced by ribs 137 as indicated. The inner edges of the baffles 135 and 136 lie closely adjacent the spindle 31 as illustrated in Figure 7. The upper baffles 135 are disposed directly below the cups 33.

The unit 7 is provided with a plurality of successive burner units 138 as illustrated in Figures 1 and 2. Any suitable number of these burner units may be provided. The structure of each of these units is illustrated best in Figures 3, 7, 12, 13 and 14.

Each of the burners 138 comprises a fan-shaped manifold 139 with its larger end disposed innermost. The inner edge of the member 139 (Figure 13) has a slot 140 formed therein. The rear wall of the slot has a shallow recess 141 formed therein which is of slightly less width than the slot 140. The slot 140 and the recess 141 extend the entire length of the manifold 139. The recess 141 is in communication with a chamber 142, formed in the interior of member 139, by means of a plurality of longitudinally spaced openings 143.

Figure 13:
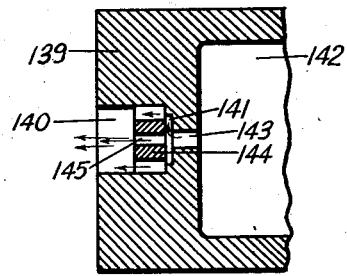
Figure 13 is a transverse section of the burner shown in Figure 12.
Figure 14:
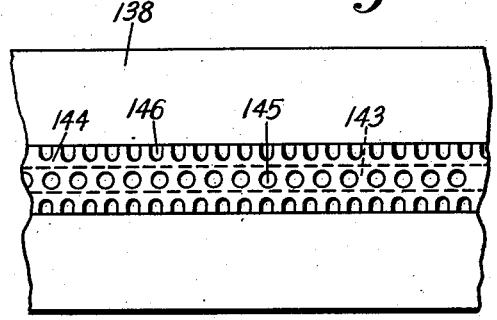
Figure 14 is a front elevation of a portion of the forward edge of the burner illustrated in Figure 12.

The slot 140 is adapted to receive a grid 144 of the type illustrated in Figures 13 and 14. This grid has a plurality of small circular openings 145 formed therein intermediate the top and bottom edges thereof, these openings being spaced slightly apart and disposed at longitudinal intervals. In the top and bottom edges of the grid 144 a plurality of longitudinally spaced U-shaped openings 146 are formed. These openings 146 extend slightly over the recess 141.

The fuel will flow from the chamber 142 through the openings 143, and into the recess 141. Most of the fuel will pass directly through the openings 145 and when ignited will form a substantially continuous ribbon of flame along the burner since the openings 145 are arranged close together. However, a small portion of the fuel will flow from the recess 141 through the openings 146. Thus, small flames will issue from both the top and bottom openings 146 and will serve as pilots for the fuel that issues through the openings 145. It will be noted from Figure 13 that the grid 144 is spaced rearwardly within the slot 140. This will result in more effective ignition of the fuel issuing from openings 145 and 146.

Each burner 138 is mounted so that it may be moved vertically inwardly or outwardly relative to the conveyor, or tilted at any desired angle to direct the flame on the articles at any desired angle. As illustrated in Figures 3 and 7, the burners 138 are disposed directly adjacent the chain conveyor outside of the conveyor. As illustrated best in Figure 12, each of the burners 138 is bolted as at 147 to the top of an inverted U-shaped bracket 148. The lower ends of the arms of this bracket 148 are pivoted by means of a pivot pin 149 to the upper ends of the arms of a U-shaped bracket 150. One of the arms of the bracket 148 has an outwardly projecting portion 151 which projects substantially at right angles thereto. The corresponding arm of the bracket 150 has a depending portion 152 arranged at an angle thereto as indicated. A screw 153 is pivoted to the portion 151 as at 154 and to the portion 152 as at 155.

The bracket 150 is rigidly mounted on the upper end of a screw 157 and the screw is keyed to the bracket. It will be apparent that since the bracket 150 is rigidly mounted, when the handwheel 156 is turned, the angular position of the bracket 148 relative to the bracket 150 will be changed. In other words, the burner 38 will be tilted upwardly or downwardly. The screw 157 passes downwardly through a sleeve 158 which is disposed in an opening formed in a block 159 intermediate the ends thereof. The sleeve 158 is non-rotatably mounted in the block 159 and the screw 157 is splined to the sleeve 158. A handwheel 160 is mounted on the threaded portion of the screw and rests on the upper end of the sleeve 158. It will be apparent that by rotating the handwheel 160, the screw 157 will be moved vertically and, consequently, the burner 138 will also be moved vertically.

It will be apparent that the vertically adjusted means is of such a nature that there will be no danger of the burner rotating about the axis of the screw 157 or, in other words, of one end of the burner being closer to the articles than the other. However, in order to prevent excessive wear on the splined connection between the screw 157 and the sleeve 158 we provide other means for preventing rotation of the burner about the axis of screw 157. Thus, the bracket 150 is provided with a pair of depending rods 161. These rods are adapted to slide through openings provided adjacent the ends of the block 159. The lower ends of these rods are connected together and held in spaced relation by a member 162. The lower end of the screw 157 is mounted in a boss formed on the upper surface of this member as at 163. Thus, the rods 161 serve as guides during the vertical adjustment of the burner and prevent rotation thereof and wear on the splined connection between screw 157 and sleeve 158.

Figure 12:
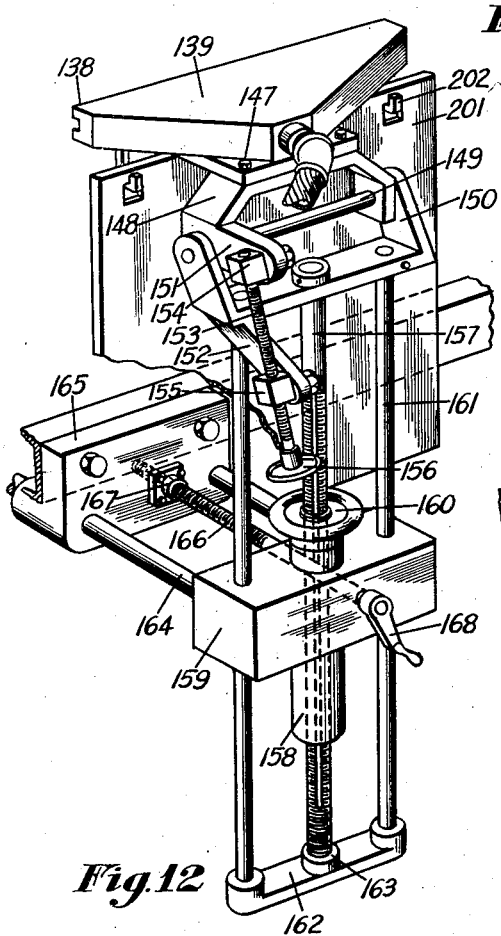
Figure 12 is a detail in perspective of the means for adjusting each of the external polishing burners.

The means for adjusting the burner laterally towards and away from the articles will now be described. As shown in Figure 12, the block 159 is carried on the outer end of rods 164. These rods are slidably mounted in a support 165 mounted on the frame of the machine. A screw 166 is disposed between the rods 164 and is threaded through a sleeve 167 secured to the support 165. The outer end of this screw 166 passes through an opening in the block 159 and is provided with a crank 168 keyed to its outer end. The screw 166 is rotatable in the block 159 and the crank 168 contacts with the outer surface of the block. Consequently, it will be apparent that when the screw 166 is rotated by means of the crank 168 the block 159 will be moved towards or away from the support 165. Consequently, the burner 138 will be moved towards or away from the article.

Thus, the burners 138 can be tilted upwardly or downwardly relative to the articles, can be adjusted horizontally towards or away from the articles, and can be adjusted vertically relative to the articles. Each of the burners 138 is adjustable independently of the others.

In order to supply fuel to each of the burners, the upper end of a flexible conduit 169 is connected to the interior of each of the manifolds 139. The lower end of the flexible conduit is connected to a mixer 170.

Figure 19:
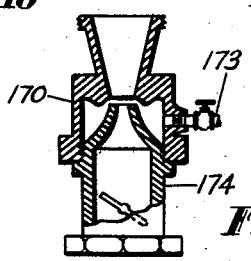
Figure 19 is a sectional view showing a Venturi mixer which we provide for supplying fuel to the various burner units.

The mixer 170 is illustrated best in Figures 3 and 19. As illustrated in Figure 19 this mixer 170 is of the Venturi type. The lower end of the Venturi tube is connected to an air line 171 through which air under pressure is forced by means of a blower 172 (Figure 2). A gas line 173 (Figure 3) leads into the side of the Venturi tube. It will be apparent that since the air is forced through the mixer, it will draw gas into the mixer from the line 173. In other words, there is an inspirator action. The flow of air into the Venturi mixer is controlled by valve 174 while the flow of gas into the mixer is controlled by valve 175. Thus, both air and gas will pass into the Venturi mixer and will be mixed properly. Because the mixer is controlled by two valves, one of which is for the gas and the other of which is for the air, it is possible to obtain the proper mixture proportion and flame length. It will be understood that the gas could be forced in under pressure instead of the air, and then the gas would draw in the air. It will further be apparent that a mixer is provided for each burner 138 and, consequently, independent adjustment of the mixture proportion and flame length of one burner may be obtained without affecting the other burners.

The mixer 99, previously referred to, for supplying the fuel mixture to the burners of the internal polishing unit 3, is exactly the same as the mixer 170 just described. Thus, the mixture proportion and flame length of the internal polishing burners may be readily controlled.

The burners 138 are disposed on one side only of the conveyor. On the opposite side of the conveyor, as illustrated in Figures 1, 3 and 7, we provide a heat reflecting baffle indicated generally by the numeral 176. This heat reflecting baffle 176 extends the full length of the unit 5 and is substantially inverted L-shaped in cross-section. It embodies a vertical wall disposed adjacent the articles on the side opposite to which the burners 138 are disposed and a horizontal wall which extends over the articles. It is preferably made up of interlocking cast-iron sections 177, insulating refractories 178 and interior surfaces are preferably composed of cast "sillimanite" blocks 179.

The baffle 176 is divided into several independent units 180, 181, 182 and 183 (Figure 2) which are independently vertically and horizontally adjustable. The adjacent ends of these units are disposed closely adjacent each other.

As shown best in Figures 1 and 7, each of the baffle units is carried by a support 184. This support 184 is supported on the upper end of a screw 185 which is non-rotatably secured thereto. This screw 185 has its lower end disposed in a sleeve 186 to which it is splined. The screw 185 may be moved vertically in the sleeve 186 by means of a handwheel 187 threaded thereon which rests against the upper end of the sleeve 186. The lower end of the sleeve 186 is mounted on a plate 188 illustrated best in Figure 3. The splined connection between the sleeve 186 and the screw 185 will prevent rotation of the baffle unit about the axis of screw 185. However, in order to prevent wear on this splined connection, we provide a rod 189 which is vertically disposed and is spaced from the screw 185. This rod 189 is immovably secured in a sleeve 190 connected to the baffle unit. The lower end of this rod is adapted to slide vertically within a sleeve 191 which is also secured to the plate 188 in spaced relation to the sleeve 186. Thus, it will be apparent that by merely rotating handwheel 187 the baffle unit may be adjusted vertically. Each baffle unit may be adjusted vertically independently of the others.

The plate 188 is mounted for movement laterally of the machine so that the baffle unit may be adjusted laterally relative to the conveyor and the articles carried thereby. Thus, as shown in Figure 3, the plate 188 is mounted on the upper plate 7 of the base of the machine for slidable movement by means of guides 192. The plate is moved laterally by means of a screw 193 which is threaded through an upstanding member 194 secured to the outer edge of the plate 188. The outer end of this screw passes freely through an opening formed in an upstanding member 195 secured to the plate 7 adjacent the edge thereof. The screw 193 may be rotated by means of a handwheel 196 which abuts the outer surface of member 195. When this member 196 is rotated, the screw 193 threads through the member 194 and the plate 188 will be moved laterally. Consequently, since the baffle unit is supported on the plate 188, it will be moved laterally relative to the conveyor and the articles carried thereby. Each baffle unit may be adjusted laterally independently of the others.

In order to protect the machine and workmen on the opposite side of the machine from the intense heat developed in the unit 4, each baffle unit is provided with a heat shield 197 hanging therefrom. Each heat shield comprises a heat resisting cast iron plate 198 which is heavily ribbed and asbestos board 199 disposed in spaced relation thereto so as to form a dead air space 200 therebetween. Each burner 138 is also provided with a heat reflecting shield 201 which is suspended from the lower surface of the burner by means of brackets 202 in such a manner that even when the burner is tilted, the shield 201 will remain vertical. The shield will serve to protect workmen at the side of the machine where the unit 7 is disposed.

In the operation of this unit 7, the articles are carried on the conveyor between the burners 138 and the baffle 176. The burners are directed towards the baffle and the flame from the burners will wrap around the articles and will then strike the baffle from which the flames will be reflected back onto the glass articles. The articles rotate about their axes as they pass through this unit. We have found that it is desirable to have the burners on one side only of the article and employ the baffle at the opposite side for reflecting the heat rather than to have burners on opposite sides of the article. When burners are provided on opposite sides of the article they oppose each other and throw the heat upwardly resulting in considerable waste. The baffle causes the flame to wrap around the article and the sillimanite surface 179 becomes white hot almost instantly.

The burners 138 may be adjusted independent of each other to proper positions depending upon operating conditions. For example, the successive burners may be set at different heights. Also, they may be set different distances from the article. In most cases it is desirable to have the first burner close to the article and the succeeding burners gradually increasing distances from the article so that the article will not be heated to such an extent as to cause distortion thereof during its passage through the unit. The baffle 176 is divided into units equal in number to the burners 138. These units are properly adjusted in accordance with the adjustment of the burners 138 with which they cooperate. Each baffle unit may be adjusted independently of the others.

The baffles 135 and 136 break up the flames coming from burners 138 and keep them from reaching the tracks 51a. The tracks 51a are cooled by the air passing therethrough and some of the air escapes from the hollow tracks in order to cool the links, bearings, etc. This results in longer life of these parts and there is less tendency for binding. The cooling air keeps the tracks from expanding to an undesirable extent.

Figure 15:
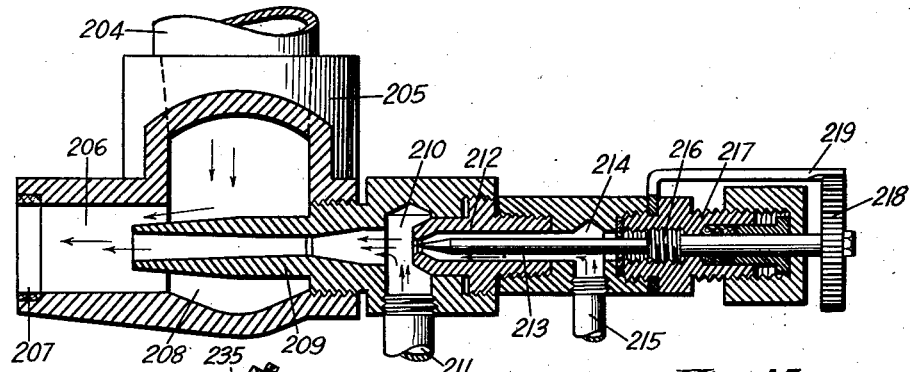
Figure 15 is a sectional view taken through the burner which we preferably provide for producing a carbon film on the exterior of the articles.

As shown in Figure 2, the last burner unit 138 is of a different type than the others. This burner unit consists of a plurality of burners of the type illustrated in Figure 15 which are arranged side by side and are directed towards the article. In this instance, as illustrated in Figure 2, the line 169 leading from a mixer 170 is connected to a manifold 203 which is connected at a plurality of points 204 to the interior of a burner 205. This burner is a smoke burner which is adapted to apply a film of carbon to the article in order to more effectively polish it. It comprises a nozzle portion 206 having a ring 207 of sillimanite disposed within its outer end. Directly behind the nozzle 206 the chamber 208 is formed which is connected to the manifold 203 as at 204. A Venturi tube 209 projects through the chamber 208 and extends into the rear end of the nozzle 206. The rear end of the passageway in the Venturi tube 209 is in communication with a passageway 210 into which an air and gas mixture is adapted to be forced through a line 211 which is also connected to the same mixer 170 to which line 169 is connected. The passageway 210 is in communication with an oil nozzle 212 having a needle 213 disposed therein and adapted to be adjusted therein to control the flow of oil from the forward end of the nozzle. The rear end of the nozzle 212 is in communication with a passageway 214 to which is connected an oil conduit 215 which runs to an oil tank such as the oil tank formed in the base of the machine. The needle member 213 is threadingly engaged as at 216 with a cap and packing gland member 217 threaded into the rear end of the burner. The needle is adapted to be rotated so that it will be moved longitudinally by means of a knurled member 218. A spring 219 normally engages this member to prevent rotation thereof.

In the operation of this burner, the main supply of air and gas mixture will enter through the manifold into the chamber 209 and will flow outwardly through the nozzle 206 as indicated by the arrows. This will set up an inspirator action drawing the fluid from the Venturi tube 209. At the same time a smaller amount of air and gas mixture is forced through the line 211 into the Venturi tube, setting up an inspirator action which tends to draw oil through the forward end of the nozzle 212; this oil being supplied by line 215. The amount of oil supplied is controlled by the setting of the needle valve and this controls the thickness of the carbon film applied to the article. Thus, with this burner the oil supplied by the line 215 is first mixed with a small amount of air and gas mixture entering the Venturi tube through the line 211. Then this comparatively small stream of oil, gas and air mixture joins with the larger stream of air and gas mixture in the nozzle 206 and is mixed therewith. This ensures that the oil will be thoroughly mixed with the gas and air mixture. The sillimanite ring 207 will become white hot immediately and will act as a pilot for igniting the fuel.

Thus, the last burner unit 138 will produce a smoke film on the article which will result in a finer polish. Although we have shown only one of these burner units, any number may be provided.

Figure 20:
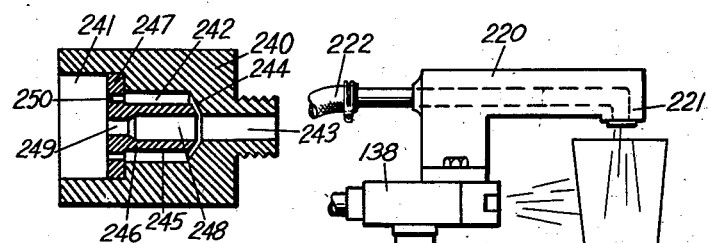
Figure 20 is a view showing one of the burner units of the external polishing unit provided with means for cooling the interior of the articles.

It is desirable to provide one or more of the burner units 138 with means for cooling the interior of the articles during the time the exterior thereof is being polished. Thus, in Figures 2 and 20 we show the second burner unit 138 provided with such means. This means comprises a hollow member 220 which is carried on top of the burner unit and which has a depending portion 221 disposed above the path of movement of the articles. The member 220 is connected by means of a flexible conduit 222 to the conduit 171 which is connected to the blower 172. Flow of air into the line 222 is controlled by a valve 223. The lower wall of portion 221 is provided with a plurality of openings through which air may flow from member 220. Thus, cooling air will flow from the member 220 into the articles to cool the interior thereof while the exterior thereof is being polished.

In the operation of the entire machine, the articles are placed on the conveyor at the station A. They are moved along by the conveyor until they reach the unit 3. The burners 91 for polishing the interior of the articles have previously been adjusted to the proper height. These burners are continually revolving about the shaft 14 whenever the conveyor is moved. As the articles reach this unit, the lower ends of the burners 91 are projected into the upper ends of the articles. At the same time the maximum amount of fuel is supplied to these burners. The lower ends of these burners must drop completely in the articles and the flames developed by the burners must be high velocity flames to prevent collecting of dead gas in the articles which would otherwise prevent the flames from reaching the bottom of the articles. The articles are carried on by the conveyor through this unit and during their passage through this unit the burners 91 extend into the articles and properly polish the articles. The burners also apply a smoke film to the interior of the articles which results in a more effective polish. At the same time that these articles pass through this unit, the exterior thereof is subjected to drafts of cooling air by means of the air channels 100. As the articles leave the unit 3, the burners 91 are lifted out of the articles. At the same time a minimum amount of fuel is supplied to the burners. The articles may or may not revolve during the internal polishing but in the unit shown they do not revolve. Cooling the outside of the article prevents distortion thereof since only the inside skin of the article is melted.

After the articles leave the unit 3 they pass into the unit 4. When passing into this unit they start to rotate about their axes although this is not necessary in passing through this unit. The air nozzles 124, being at the proper height, direct cooling air downwardly into the interior of the articles. Of course, some of the air also passes onto the exterior of the articles. Thus, the interior of the articles is effectively cooled in passing through this unit.

The conveyor continues to move the articles along until they enter the unit 5. As they pass through this unit, the articles are rotated and they pass between the burner units 138 and the baffle 176. The burner units direct the flames into contact with the articles and the heat is reflected back by the heat reflecting baffle. The burner units 138 and the baffle units are previously adjusted in accordance with the operating conditions in the type of ware being polished. These burner units will effectively polish the exterior of the article. One or more of the burner units may be adjusted so that it will direct its flames downwardly on top of the edges of the articles in order to polish the edges thereof. The cooling unit carried by the second burner unit 138 will effectively cool the interior of the articles since the nozzle 221 will direct cooling air into the interior thereof. The last burner unit 138 will apply a smoke film to the articles in order to more effectively polish them.

The conveyor will continue to carry the articles along until they again reach the station A where they may be removed. By the time they reach this station they will be sufficiently cooled to permit removal.

It will be understood that although in describing our method we state that the interior of the article is first polished and then the exterior thereof is polished, it will be understood that these operations may be reversed.

It will be apparent that during the movement of the conveyor, the conveyor parts and other associated parts of the machine will be continuously and automatically oiled by oil supplied by the tanks 46 and associated parts. Furthermore, the structure illustrated in Figure 11 will ensure that the pinions on the spindles which support the articles will properly mesh with the rack 106 at the proper time without danger of injury to the pinions or racks. Furthermore, the extended and turned portion 53 of the track 51 will ensure that the links will be stripped from the sprocket 12 at the proper time.

If the conveyor chain has too much slack in it, the entire unit 3 may be adjusted longitudinally by means of screw 19 to take up the slack.

Figure 16:
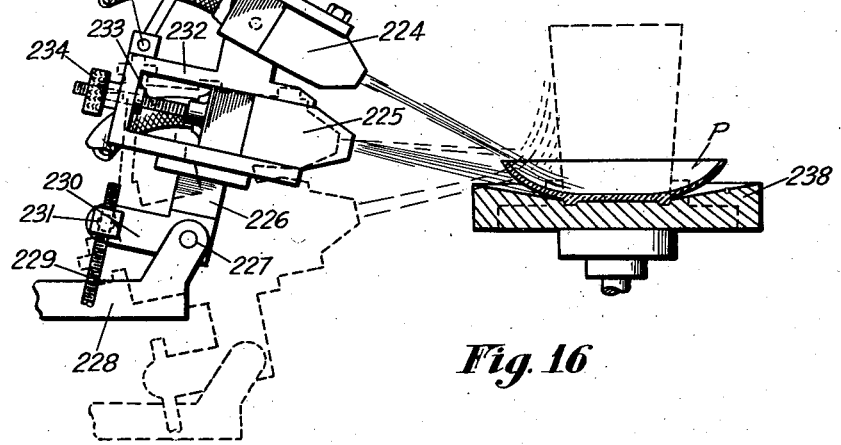
Figure 16 illustrates a burner unit which is particularly useful for polishing plates or similar articles.

In Figure 16 we illustrate a burner unit which may be substituted for any of the burner units 138 or may be mounted at a different station along the conveyor. This burner unit is particularly useful in polishing and heating plate-forming blanks, such as that indicated by the letter P, until they drop or sag although it may be used for polishing other articles such as tumblers. It is adapted to be mounted on the adjustable burner unit support illustrated in Figure 12.

This burner unit comprises two vertically spaced manifolds 224 and 225 which may be similar to the manifold of the burners 138. Both manifolds are mounted on a supporting bracket 226 which is pivoted as at 227 to a support 228 which is preferably the same as member 150 (Figure 12) and may be moved both vertically and laterally. Movement of the bracket 226 about the pivot 227 is preferably controlled by a screw 229 pivoted to an arm 230 carried by bracket 226 as at 231. The screw 229 corresponds to screw 153 (Figure 12) and preferably has its opposite end suitably mounted on a pivoted member carried by the support 228. The lower manifold 225 is slidably mounted in a U-shaped portion 232 formed on the bracket 226. Forward and rearward movement of this manifold in U-shaped portion 232 may be accomplished by a screw 233 and nut 234. The upper manifold 224 is pivoted as at 234' to the upper end of the bracket 226 at a point spaced above the point where the manifold 225 is disposed. The angular position of the manifold 224 relative to the manifold 225 may be varied by means of a screw and nut adjustment 235, the screw being pivotally connected to the portion 232 of bracket 226 as at 236 and to the upper manifold member 224 by means of a strap 237.

It will be apparent that when the bracket 226 is swung about the pivot 227 the position of both manifolds relative to the article support 238 is changed. Furthermore, by adjusting the screw 235, the angular position of the two manifolds relative to each other may be readily changed. Also, by adjusting nut 234, the manifold 225 may be moved forwardly or rearwardly. Consequently, it is possible to direct the flame issuing from the lower manifold 225 on the outside of an article P which is a blank for a plate that must be melted down until it rests on the article support 238, and to direct the flame issuing from the manifold 224 onto the interior of the article. Thus, the blank may be readily melted down until it assumes the shape of the member on which it is supported, which will be the final shape of the plate. However, it is also possible to adjust the two manifolds relative to each other in such a manner, as indicated by the dotted lines, that the two flames meet at a preselected point on the article, for example, on a tumbler. This will produce an extremely hot flame at such point, it being possible to obtain a hotter flame with the two burners than with a single burner or with burners opposite each other. If the flames are directed at a point adjacent the bottom of the tumbler, they will be deflected upwardly along the outer surface of the tumbler.

Figure 18:
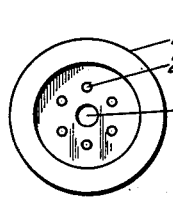
Figure 18 is a front view of the structure illustrated in Figure 17.
Figure 17:
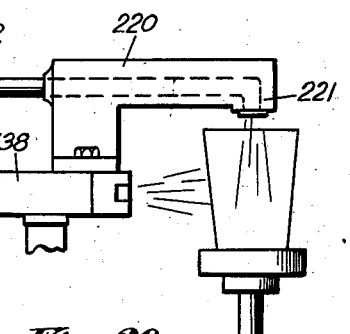
Figure 17 is a section of a burner which may be used in place of the type illustrated in Figures 13 and 14.

In Figures 17 and 18 we have illustrated a burner a plurality of which may be substituted for the ribbon-type burner units 138. This burner comprises a substantially cylindrical body portion 240 having a cylindrical chamber 241 formed adjacent its outer end and a smaller cylindrical chamber 242 formed therein behind the outer chamber 241. A circular passageway 243 leads into the rear end of the chamber 242, there being a bevelled surface 244 between passage 243 and chamber 242. A member 245 is adapted to be inserted in the body portion 240. This member comprises a tubular portion 246 which is adapted to be disposed within the chamber 242 in spaced relation thereto and a disk-like portion 247 on the forward end thereof which is disposed within the chamber 241 and is adapted to rest on the shoulder formed between the chambers 241 and 242. A passageway 248 extends through the member 245 and is centrally disposed therein. The rear end of the passageway 248 communicates with the passage 243 while the forward end thereof is reduced as at 249 and communicates with chamber 241 at the rear side thereof. Thus, an annular space is formed around the portion 246. The forward end of this annular space communicates with the chamber 241 by means of a plurality of circumferentially spaced small apertures 250. The rear end of this annular chamber is in communication with the inlet passage 243 by means of a small passageway formed between the bevelled rear edge 251 of the tubular portion 246 and the shoulder 244.

In the operation of this burner, the gas and air mixture will enter through the inlet passage 243 and most of it will flow through passage 248 and then outwardly through the reduced portion 249 and as it issues it will be ignited. However, a small portion of the gas and air mixture will flow into the annular space around the portion 246 and then forwardly through the small apertures 250 and as it issues through these apertures it will be ignited forming a plurality of pilot flames which will be disposed around the main flame issuing from the central opening. It will be noted that the portion 247 is spaced rearwardly within the chamber 241. This will ensure proper ignition of the fuel issuing from the burner and proper functioning of the pilot flames.

It will be apparent from the above description that we have provided an apparatus for glazing or polishing articles of glassware having many advantages. The apparatus is designed particularly for glazing or polishing pressed or machine-blown ware. Since the machine not only polishes the exterior of the articles but also the interior thereof, the articles produced will have the characteristics of glassware produced by hand and polished in a glory hole. The machine is of such a nature that although it uses only a minimum amount of fuel, it will produce a fine polish or glaze on articles of glassware. It may be employed for polishing a large number of different types and shapes of glassware. Furthermore, the polishing of the articles is accomplished without causing undesirable distortion thereof. The machine is of such a nature that the various parts thereof are protected from the intense heat developed during the glazing operation. Furthermore, the machine is equipped with an effective lubricating system which operates automatically so that its efficiency is not dependent upon an operator. It will be noted that the upper surfaces of the tracks upon which the links of the conveyor slide are flat and are of such construction that broken glass will be knocked therefrom by the projecting portions of the links which slide therealong. In other words, the tracks are self-cleaning and the broken glass will not have a chance to reach the conveyor parts.

Many other advantages will be apparent from the preceding description, the drawings and the following claims.

Having thus described our invention, what we claim is:

1. A machine for polishing glassware comprising an internal polishing unit embodying a plurality of burners adapted to be projected into the articles, means for projecting said burners into said articles and withdrawing them therefrom, means associated with said internal polishing unit for cooling the exterior of the articles while the interior thereof is being polished, a unit for cooling the interior of the articles after they leave the internal polishing unit and embodying means for directing cooling fluid into the interior of the articles, and an external polishing unit for polishing the exterior of the articles and embodying burners for directing flames on the exterior of the articles.

2. A machine for polishing glassware comprising an internal polishing unit embodying a plurality of burners adapted to be projected into the articles, means for projecting said burners into said articles and withdrawing them therefrom, means associated with said internal polishing unit for cooling the exterior of the articles while the interior thereof is being polished and embodying means for directing cooling medium onto the articles, a unit for cooling the interior of the articles after they leave the internal polishing unit and embodying means for directing cooling medium into the interior of the articles, an external polishing unit for polishing the exterior of the articles and embodying burners for directing flames on the exterior of the articles, and means associated with said external polishing unit for directing cooling medium into the interior of the articles while the exterior thereof is being polished.

3. In a machine for polishing glassware, a horizontally disposed movable conveyor for supporting articles and conveying them through the machine, said conveyor including an arcuate portion where its direction of movement is changed, an internal polishing unit for polishing the interior of the glass articles carried by said conveyor, said internal polishing unit being located adjacent the arcuate portion of said conveyor, said internal polishing unit comprising a rotatable burner carrier which rotates in response to movement of the conveyor, said burner carrier carrying a plurality of fire-polishing burners which are mounted for vertical movement on the carrier, rotation of said carrier being adapted to position some of the burners over the articles on the arcuate portion of the conveyor, means for lowering the burners into the upper ends of the articles as they are positioned over the articles, continued rotation of said burner carrying member being adapted to move burners away from the articles, and means for raising the burners from the articles as they are moved away therefrom.

4. In a machine for polishing glassware, a horizontally disposed movable conveyor for supporting articles and conveying them through the machine, said conveyor including an arcuate portion where its direction of movement is changed, an internal polishing unit for polishing the interior of the glass articles carried by said conveyor, said internal polishing unit being located adjacent the arcuate portion of said conveyor, said internal polishing unit comprising a rotatable burner-carrier which rotates in response to movement of the conveyor, said burner-carrier having a plurality of radially projecting vertically movable arms mounted thereon, each of said arms carrying a depending fire-polishing burner, each of said burners being vertically adjustable on its supporting arm, rotation of said carrier being adapted to position some of the burners over the articles on the arcuate portion of the conveyor and to move some of the burners away from the articles on the conveyor, and cam means associated with said burner-carrier for lowering the burners into the articles as they move into position thereover and for raising the burners from the articles as they move away from the articles.

5. In a machine for polishing glassware, a horizontally disposed movable conveyor for supporting articles and conveying them through the machine, said conveyor including an arcuate portion where its direction of movement is changed, an internal polishing unit for polishing the interior of the glass articles carried by said conveyor, said internal polishing unit being located adjacent the arcuate portion of said conveyor, said internal polishing unit comprising a rotatable burner-carrier which rotates in response to movement of the conveyor, said burner-carrier having a plurality of radially projecting vertically movable arms mounted thereon, each of said arms carrying a depending fire-polishing burner, each of said burners being vertically adjustable on its supporting arm, rotation of said carrier being adapted to position some of the burners over the articles on the arcuate portion of the conveyor and to move some of the burners away from the articles on the conveyor, cam means associated with said burner-carrier for lowering the burners into the articles as they move into position thereover and for raising the burners from the articles as they move away from the articles, means for supplying fuel to the burners continuously, and means for varying the amount of fuel supplied to the burners so that a maximum amount of fuel will be supplied when the burners are positioned over the articles and a minimum amount of fuel will be supplied when the burners are moved away from the articles.

6. In a machine for polishing glassware, a conveyor for supporting articles and conveying them through the machine, a unit for polishing the interior of the glass articles carried by said conveyor, said unit being associated with said conveyor and embodying a plurality of fire-polishing burners, means for positioning the burners over the articles as they move into the internal polishing unit and moving the burners away from the articles as they leave the internal polishing unit, means for supplying fuel to the burners, and means for varying the amount of fuel supplied to the burners so that a maximum amount of fuel will be supplied when the burners are positioned over the articles and a minimum amount of fuel will be supplied when the burners are moved away from the articles.

7. In a machine for polishing glassware, a conveyor for conveying the articles to the machine, a unit associated with the conveyor for polishing the interior of articles and embodying a plurality of fire-polishing burners, a unit for cooling the interior of the articles as they leave the internal fire-polishing unit, said cooling unit embodying a vertically movable member carrying a plurality of depending nozzles which are disposed over the articles carried by the conveyor, and means for supplying cooling medium to said nozzles.

CHARLES T. STEWART.
CHARLES O. STEWART.